US011212530B2

(12) United States Patent
Choi et al.

(10) Patent No.: US 11,212,530 B2
(45) Date of Patent: Dec. 28, 2021

(54) METHOD FOR SLICE, TILE AND BRICK SIGNALING

(71) Applicant: TENCENT AMERICA LLC, Palo Alto, CA (US)

(72) Inventors: Byeongdoo Choi, Palo Alto, CA (US); Shan Liu, San Jose, CA (US); Stephan Wenger, Hillsborough, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/902,574

(22) Filed: Jun. 16, 2020

(65) Prior Publication Data

US 2020/0404268 A1 Dec. 24, 2020

Related U.S. Application Data

(60) Provisional application No. 62/865,941, filed on Jun. 24, 2019.

(51) Int. Cl.
*H04N 19/119* (2014.01)
*H04N 19/176* (2014.01)
*H04N 19/174* (2014.01)
*H04N 19/105* (2014.01)

(52) U.S. Cl.
CPC ......... *H04N 19/119* (2014.11); *H04N 19/105* (2014.11); *H04N 19/174* (2014.11); *H04N 19/176* (2014.11)

(58) Field of Classification Search
None
See application file for complete search history.

(56) References Cited

U.S. PATENT DOCUMENTS 10,917,637 B2 * 2/2021 Yoo ............... H04N 19/157
2020/0351497 A1 * 11/2020 Skupin ............ H04N 19/17

OTHER PUBLICATIONS

Benjamin Bross et al., "Versatile Video Coding (Draft 5)", Joint Video Experts Team (JVET) of ITU-T SG 16 WP 3 and ISO/IEC JTC 1/SC 29/WG 11; JVET-N1001v8, Mar. 19-27, 2019, 400 pgs., 14th Meeting: Geneva, CH.

* cited by examiner

*Primary Examiner* — Chikaodili E Anyikire
(74) *Attorney, Agent, or Firm* — Sughrue Mion, PLLC

(57) ABSTRACT

Methods and systems for decoding a picture. A method includes receiving a coded video stream including a picture partitioned into first sub-picture units, the first sub-picture units including one first sub-picture unit, and an additional first sub-picture unit including a first ordered second sub-picture unit, from among second sub-picture units of the additional first sub-picture unit, and a last ordered second sub-picture unit, from among the second sub-picture units of the additional first sub-picture unit. The method further including decoding the picture, the decoding including obtaining index values of the first ordered second sub-picture unit and the last ordered second sub-picture unit of the additional first sub-picture unit, without the coded video stream explicitly signaling any of the index values and a difference value between the index values of the first ordered second sub-picture unit and the last ordered second sub-picture unit to the at least one processor.

19 Claims, 9 Drawing Sheets

| 520 (510) | 520 | 520 | 520 (510) |
| 520 (510) | 520 | 520 | 520 (510) |
| 520 (510) | 520 | 520 | 520 (510) |
| 520 (510) | 520 (510) | 520 (510) | 520 (510) |

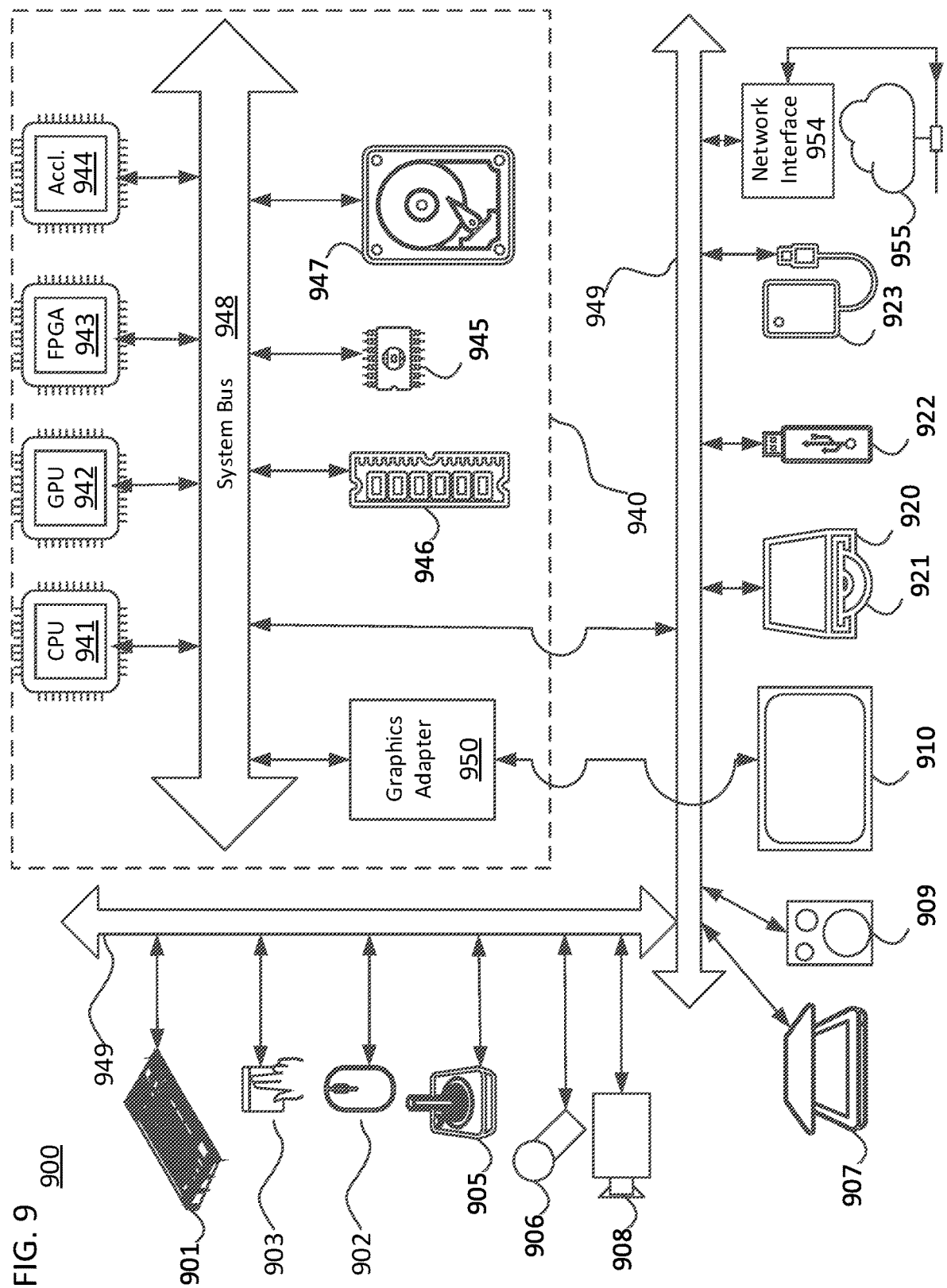

METHOD FOR SLICE, TILE AND BRICK SIGNALING

CROSS-REFERENCE TO RELATED APPLICATION

This application claims priority from U.S. Provisional Application No. 62/865,941, filed on Jun. 24, 2019, the disclosure of which is incorporated herein by reference in its entirety.

FIELD

Embodiments of the disclosure relate to video coding and decoding, and more specifically, to encoding and decoding a video stream including tile, brick, and slice signaling.

BACKGROUND

The document "Versatile Video Coding (Draft 5)" (also known as JVET-N10001-v8), dated March 2019, describes examples of tile, brick, and slice partitioning. The document is incorporated herein by reference in its entirety.

SUMMARY

Some embodiments of the present disclosure improve bit efficiency in comparison to techniques described in "Versatile Video Coding (Draft 5)."

According to some embodiments, a method performed by at least one processor is provided. The method includes: receiving a coded video stream including a picture partitioned into first sub-picture units, the first sub-picture units including: one first sub-picture unit, and an additional first sub-picture unit including a first ordered second sub-picture unit, from among second sub-picture units of the additional first sub-picture unit, and a last ordered second sub-picture unit, from among the second sub-picture units of the additional first sub-picture unit. The method further includes decoding the picture, the decoding including: obtaining index values of the first ordered second sub-picture unit and the last ordered second sub-picture unit of the additional first sub-picture unit, without the coded video stream explicitly signaling any of the index values and a difference value between the index values of the first ordered sub-picture unit and the last ordered second sub-picture unit to the at least one processor, and wherein the additional first sub-picture unit has an order value that is subsequent to an order value of the one first sub-picture unit.

According an embodiment, the one first sub-picture unit includes a last ordered second sub-picture unit, from among second sub-picture units of the one first sub-picture unit, and the obtaining the index value of the first ordered second sub-picture unit of the additional first sub-picture unit includes obtaining the index value of the first ordered second sub-picture unit of the additional first sub-picture unit based on an index value of the last ordered second sub-picture unit of the one first sub-picture unit.

According to an embodiment, the obtaining the index value of the last ordered second sub-picture unit of the additional first sub-picture unit includes obtaining the index value of the last ordered second sub-picture unit of the additional first sub-picture unit based on a value corresponding to a total number of second sub-picture units within all of the first sub-picture units within the picture.

According to an embodiment, the one first sub-picture unit includes a last ordered second sub-picture unit, from among second sub-picture units of the one first sub-picture unit, the obtaining the index value of the first ordered second sub-picture unit of the additional first sub-picture unit includes obtaining the index value of the first ordered second sub-picture unit of the additional first sub-picture unit based on the index value of the last ordered second sub-picture unit of the one first sub-picture unit, and the obtaining the index value of the last ordered second sub-picture unit of the additional first sub-picture unit includes obtaining the last ordered second sub-picture unit of the additional first sub-picture unit based on a value corresponding to a total number of second sub-picture units from all of the first sub-picture units within the picture.

According to an embodiment, the first sub-picture units are rectangular slices and the second sub-picture units are bricks.

According to an embodiment, the additional first sub-picture unit is a last ordered slice of the picture, and the one first sub-picture unit is a second to last ordered slice of the picture.

According to an embodiment, the last ordered second sub-picture unit of the one first sub-picture unit is a bottom-right brick of the one first sub-picture unit, and the first ordered second sub-picture unit of the additional first sub-picture unit is a top-left brick of the additional first sub-picture unit, and the last ordered second sub-picture unit of the additional first sub-picture is a bottom-right brick of the additional first sub-picture unit.

According to an embodiment, the first sub-picture units are rectangular slices and the second sub-picture units are bricks.

According to an embodiment, the additional first sub-picture unit is a last ordered slice of the picture, and the one first sub-picture unit is a second to last ordered slice of the picture.

According to an embodiment, the decoding further includes: obtaining an index value of a first ordered second sub-picture unit of the one first sub-picture unit and an index value of the last ordered second sub-picture unit of the one first sub-picture unit, wherein the index value of the first ordered second sub-picture unit of the one first sub-picture unit, and the index value of the last ordered second sub-picture unit of the one first sub-picture unit are obtained based on a picture parameter set.

According to some embodiments, a system for decoding a coded video stream is provided. The system includes memory configured to store computer program code; and at least one processor configured to receive the coded video stream. The coded video stream includes a picture partitioned into first sub-picture units including: one first sub-picture unit, and an additional first sub-picture unit including a first ordered second sub-picture unit, from among second sub-picture units of the additional first sub-picture unit, and a last ordered second sub-picture unit, from among the second sub-picture units of the additional first sub-picture unit. The at least one processor is further configured to access the computer program code, and operate as instructed by the computer program code, the computer program code includes decoding code configured to cause the at least one processor to: obtain index values of the first ordered second sub-picture unit and the last ordered second sub-picture unit of the additional first sub-picture unit, without the coded video stream explicitly signaling the index values and a difference value between the index values of the first ordered second sub-picture unit and the last ordered second sub-picture unit to the at least one processor, and wherein the additional first sub-picture unit has an order value that is subsequent to an order value of the one first sub-picture unit.

According to an embodiment, the one first sub-picture unit includes a last ordered second sub-picture unit, from among second sub-picture units of the one first sub-picture unit, and the decoding code is configured to cause the at least one processor to obtain the index value of the first ordered second sub-picture unit of the additional first sub-picture unit based on an index value of the last ordered second sub-picture unit of the one first sub-picture unit.

According to an embodiment, the decoding code is configured to cause the at least one processor to obtain the index value of the last ordered second sub-picture unit of the additional first sub-picture unit based on a value corresponding to a total number of second sub-picture units within all of the first sub-picture units within the picture.

According to an embodiment, the one first sub-picture unit includes a last ordered second sub-picture unit, from among second sub-picture units of the one first sub-picture unit, and the decoding code is configured to cause the at least one processor to: obtain the index value of the first ordered second sub-picture unit of the additional first sub-picture unit based on the index value of the last ordered second sub-picture unit of the one first sub-picture unit, and obtain the index value of the last ordered second sub-picture unit of the additional first sub-picture unit based on a value corresponding to a total number of second sub-picture units from all of the first sub-picture units within the picture.

According to an embodiment, the first sub-picture units are rectangular slices and the second sub-picture units are bricks.

According to an embodiment, the additional first sub-picture unit is a last ordered slice of the picture, and the one first sub-picture unit is a second to last ordered slice of the picture.

According to an embodiment, the last ordered second sub-picture unit of the one first sub-picture unit is a bottom-right brick of the one first sub-picture unit, and the first ordered second sub-picture unit of the additional first sub-picture unit is a top-left brick of the additional first sub-picture unit, and the last ordered second sub-picture unit of the additional first sub-picture is a bottom-right brick of the additional first sub-picture unit.

According to an embodiment, the first sub-picture units are rectangular slices and the second sub-picture units are bricks.

According to an embodiment, the additional first sub-picture unit is a last ordered slice of the picture, and the one first sub-picture unit is a second to last ordered slice of the picture.

According to some embodiments, a non-transitory computer-readable medium storing computer instructions is provided. The computer instructions, when executed by at least one processor, cause the at least one processor to: decode a picture from a coded video stream that includes the picture partitioned into first sub-picture units that include: one first sub-picture unit, and an additional first sub-picture unit including a first ordered second sub-picture unit, from among second sub-picture units of the additional first sub-picture unit, and a last ordered second sub-picture unit, from among the second sub-picture units of the additional first sub-picture unit. The instructions are configured to cause the at least one processor to decode the picture by obtaining index values of the first ordered second sub-picture unit and the last ordered second sub-picture unit of the additional first sub-picture unit, without the coded video stream explicitly signaling the index values and a difference value between the index values of the first ordered second sub-picture unit and the last ordered second sub-picture unit to the at least one processor, and wherein the additional first sub-picture unit has an order value that is subsequent to an order value of the one first sub-picture unit.

BRIEF DESCRIPTION OF DRAWINGS

Further features, the nature, and various advantages of the disclosed subject matter will be more apparent from the following detailed description and the accompanying drawings in which:

FIG. 6 is a diagram for illustrating brick partitioning of the picture in accordance with an embodiment.

FIG. 9 is a diagram of a computer system suitable for implementing embodiments.

DETAILED DESCRIPTION

Figure 1:
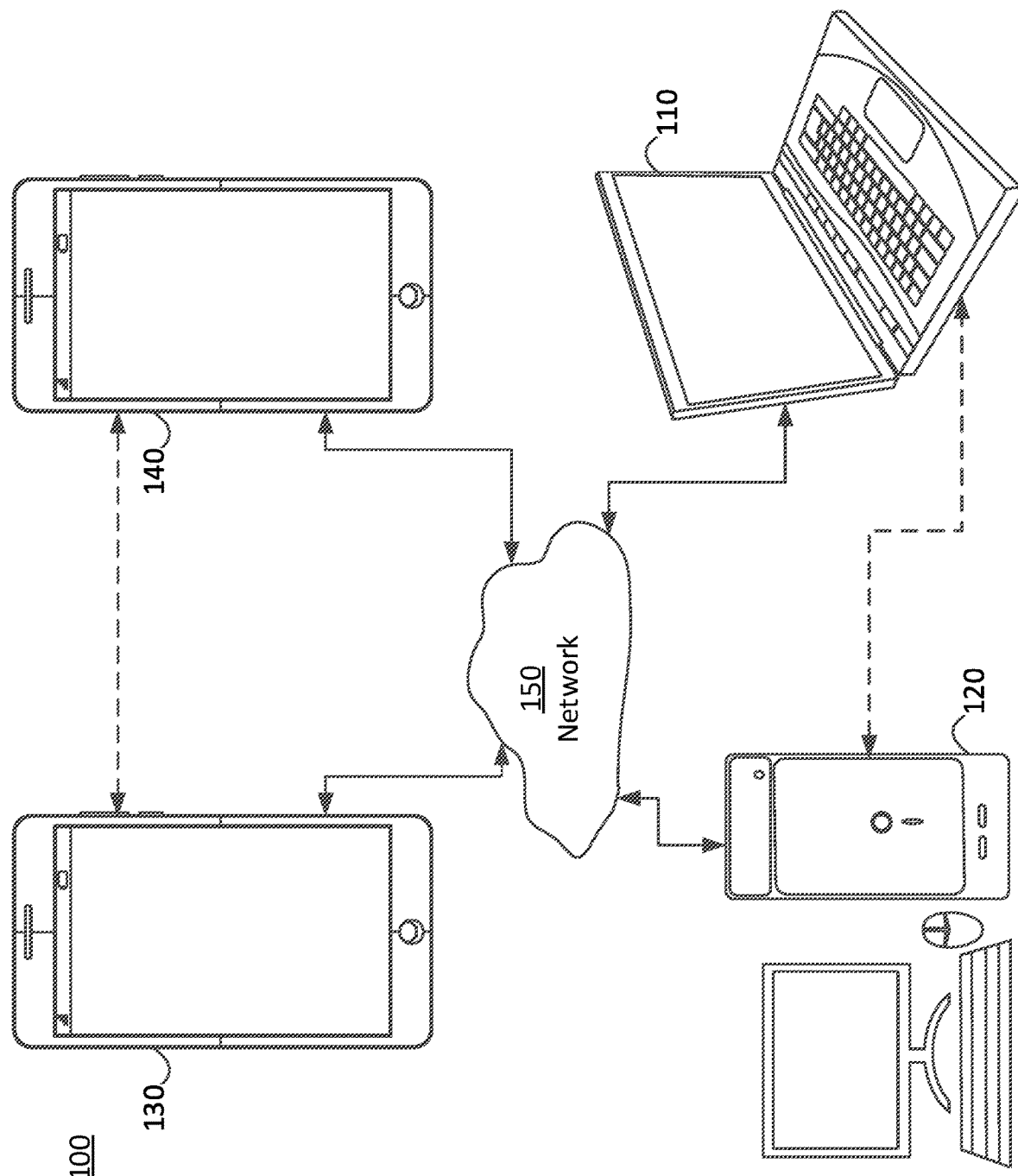
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data.

Unidirectional data transmission may be common in media serving applications and the like.

FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
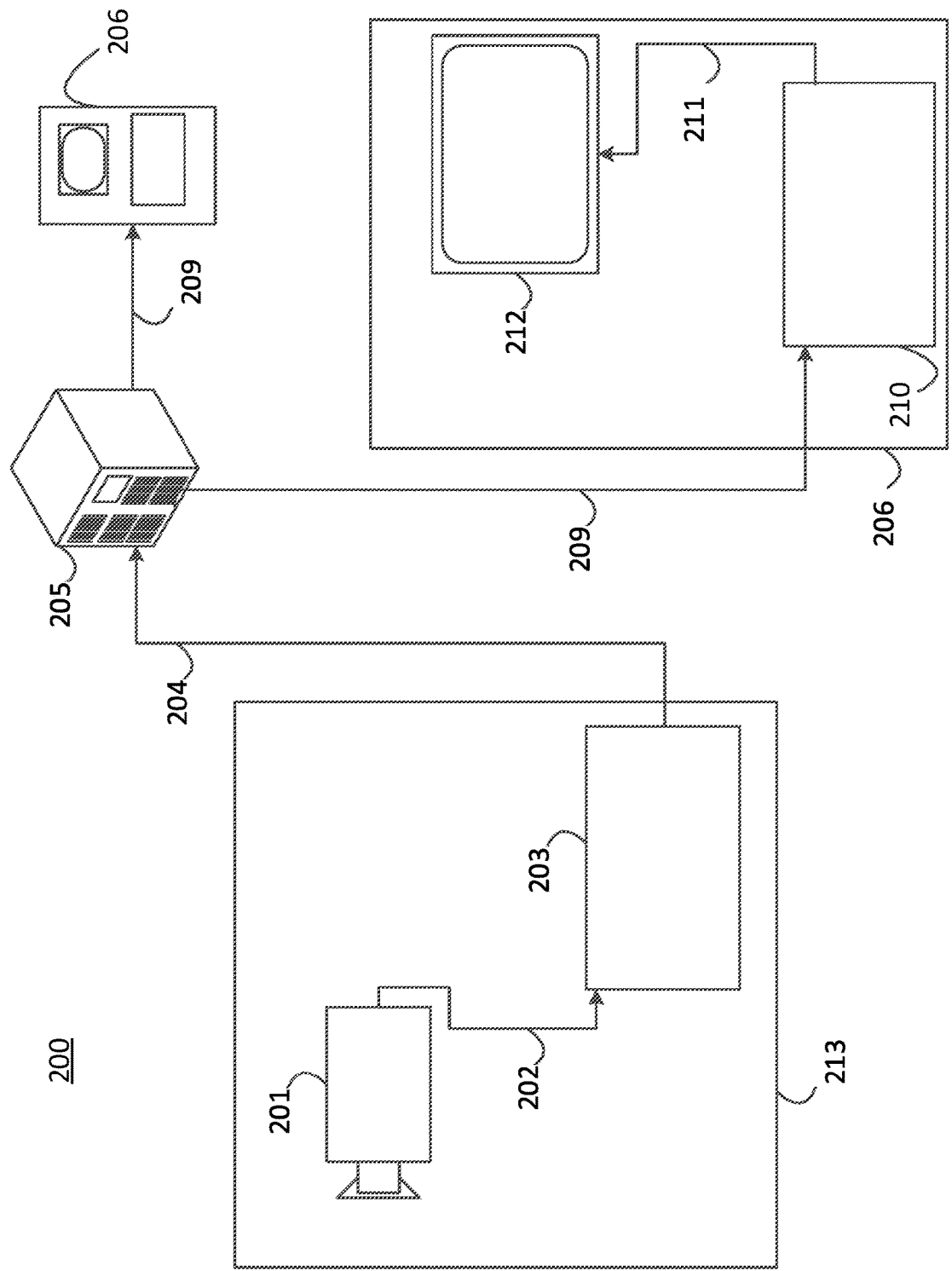
FIG. 2 is a schematic illustration of a simplified block diagram of a communication system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, an uncompressed video sample stream 202. The video source 201 may be, for example, a digital camera. The sample stream 202, depicted as a bold line to emphasize a high data volume when compared to encoded video bitstreams, can be processed by the encoder 203 coupled to the camera 201. The encoder 203 can include hardware, software, or a combination thereof to enable or implement aspects of the disclosed subject matter as described in more detail below. The encoder 203 may also generate an encoded video bitstream 204. The encoded video bitstream 204, depicted as a thin line to emphasize a lower data volume when compared to the uncompressed video sample stream 202, can be stored on a streaming server 205 for future use. One or more streaming clients 206 can access the streaming server 205 to retrieve video bit streams 209 that may be copies of the encoded video bitstream 204.

In embodiments, the streaming server 205 may also function as a Media-Aware Network Element (MANE). For example, the streaming server 205 may be configured to prune the encoded video bitstream 204 for tailoring potentially different bitstreams to one or more of the streaming clients 206. In embodiments, a MANE may be separately provided from the streaming server 205 in the streaming system 200

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265. Under development is a video coding standard informally known as Versatile Video Coding (VVC). Embodiments of the disclosure may be used in the context of VVC.

Figure 3:
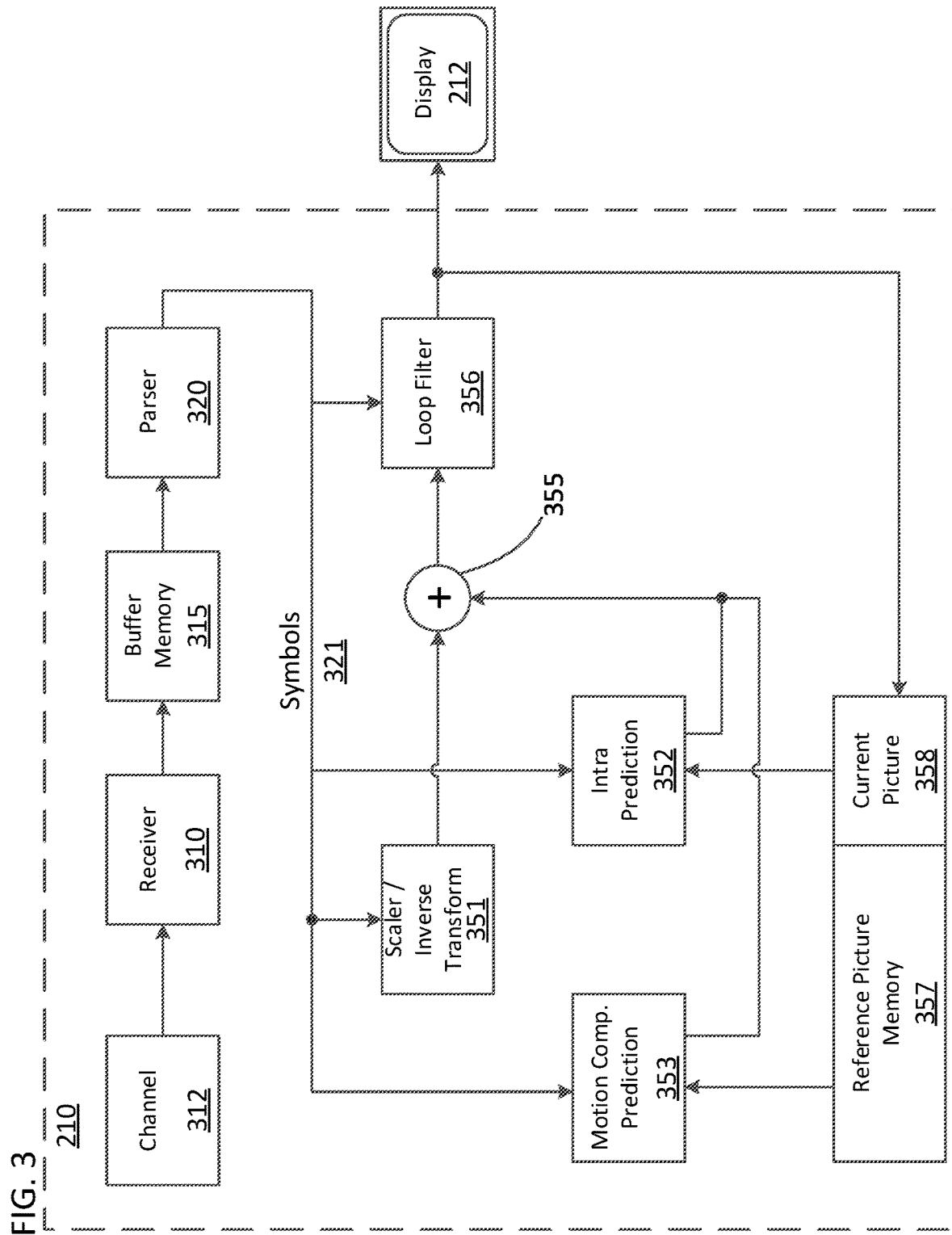
FIG. 3 is a schematic illustration of a simplified block diagram of a decoder in accordance with an embodiment.

FIG. 3 illustrates an example functional block diagram of a video decoder 210 that is attached to a display 212 according to an embodiment of the present disclosure.

The video decoder 210 may include a channel 312, receiver 310, a buffer memory 315, an entropy decoder/parser 320, a scaler/inverse transform unit 351, an intra prediction unit 352, a Motion Compensation Prediction unit 353, an aggregator 355, a loop filter unit 356, reference picture memory 357, and current picture memory 358. In at least one embodiment, the video decoder 210 may include an integrated circuit, a series of integrated circuits, and/or other electronic circuitry. The video decoder 210 may also be partially or entirely embodied in software running on one or more CPUs with associated memories.

In this embodiment, and other embodiments, the receiver 310 may receive one or more coded video sequences to be decoded by the decoder 210 one coded video sequence at a time, where the decoding of each coded video sequence is independent from other coded video sequences. The coded video sequence may be received from the channel 312, which may be a hardware/software link to a storage device which stores the encoded video data. The receiver 310 may receive the encoded video data with other data, for example, coded audio data and/or ancillary data streams, that may be forwarded to their respective using entities (not depicted). The receiver 310 may separate the coded video sequence from the other data. To combat network jitter, the buffer memory 315 may be coupled in between the receiver 310 and the entropy decoder/parser 320 ("parser" henceforth). When the receiver 310 is receiving data from a store/forward device of sufficient bandwidth and controllability, or from an isosynchronous network, the buffer 315 may not be used, or can be small. For use on best effort packet networks such as the Internet, the buffer 315 may be required, can be comparatively large, and can be of adaptive size.

The video decoder 210 may include the parser 320 to reconstruct symbols 321 from the entropy coded video sequence. Categories of those symbols include, for example, information used to manage operation of the decoder 210, and potentially information to control a rendering device such as a display 212 that may be coupled to a decoder as illustrated in FIG. 2. The control information for the rendering device(s) may be in the form of, for example, Supplementary Enhancement Information (SEI) messages or Video Usability Information (VUI) parameter set fragments (not depicted). The parser 320 may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser 320 may extract from the coded video sequence a set of subgroup parameters for at least one of the subgroups of pixels in the video decoder, based upon at least one parameters corresponding to the group. Subgroups can include Groups of Pictures (GOPs), pictures, tiles, slices, macroblocks, Coding Units (CUs), blocks, Transform Units (TUs), Prediction Units (PUs) and so forth. The parser 320 may also extract from the coded video sequence information such as transform coefficients, quantizer parameter values, motion vectors, and so forth.

The parser 320 may perform entropy decoding/parsing operation on the video sequence received from the buffer 315, so to create symbols 321.

Reconstruction of the symbols 321 can involve multiple different units depending on the type of the coded video picture or parts thereof (such as: inter and intra picture, inter and intra block), and other factors. Which units are involved, and how they are involved, can be controlled by the subgroup control information that was parsed from the coded video sequence by the parser 320. The flow of such subgroup control information between the parser 320 and the multiple units described below is not depicted for clarity.

Beyond the functional blocks already mentioned, the decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

One unit may be the scaler/inverse transform unit 351. The scaler/inverse transform unit 351 may receive quantized transform coefficient as well as control information, including which transform to use, block size, quantization factor, quantization scaling matrices, etc. as symbol(s) 321 from the parser 320. The scaler/inverse transform unit 351 can output blocks comprising sample values that can be input into the aggregator 355.

In some cases, the output samples of the scaler/inverse transform 351 can pertain to an intra coded block; that is: a block that is not using predictive information from previously reconstructed pictures, but can use predictive information from previously reconstructed parts of the current picture. Such predictive information can be provided by the intra picture prediction unit 352. In some cases, the intra picture prediction unit 352 generates a block of the same size and shape of the block under reconstruction, using surrounding already reconstructed information fetched from the current (partly reconstructed) picture from the current picture memory 358. The aggregator 355, in some cases, adds, on a per sample basis, the prediction information the intra prediction unit 352 has generated to the output sample information as provided by the scaler/inverse transform unit 351.

In other cases, the output samples of the scaler/inverse transform unit 351 can pertain to an inter coded, and potentially motion compensated block. In such a case, a Motion Compensation Prediction unit 353 can access the reference picture memory 357 to fetch samples used for prediction. After motion compensating the fetched samples in accordance with the symbols 321 pertaining to the block, these samples can be added by the aggregator 355 to the output of the scaler/inverse transform unit 351 (in this case called the residual samples or residual signal) so to generate output sample information. The addresses within the reference picture memory 357, from where the Motion Compensation Prediction unit 353 fetches prediction samples, can be controlled by motion vectors. The motion vectors may be available to the Motion Compensation Prediction unit 353 in the form of symbols 321 that can have, for example x, Y, and reference picture components. Motion compensation also can include interpolation of sample values as fetched from the reference picture memory 357 when sub-sample exact motion vectors are in use, motion vector prediction mechanisms, and so forth.

The output samples of the aggregator 355 can be subject to various loop filtering techniques in the loop filter unit 356. Video compression technologies can include in-loop filter technologies that are controlled by parameters included in the coded video bitstream and made available to the loop filter unit 356 as symbols 321 from the parser 320, but can also be responsive to meta-information obtained during the decoding of previous (in decoding order) parts of the coded picture or coded video sequence, as well as responsive to previously reconstructed and loop-filtered sample values.

The output of the loop filter unit 356 can be a sample stream that can be output to a render device such as a display 212, as well as stored in the reference picture memory 357 for use in future inter-picture prediction.

Certain coded pictures, once fully reconstructed, can be used as reference pictures for future prediction. Once a coded picture is fully reconstructed and the coded picture has been identified as a reference picture (by, for example, parser 320), the current reference picture stored in the current picture memory 358 can become part of the reference picture memory 357, and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also, for compliance with some video compression technologies or standards, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver 310 may receive additional (redundant) data with the encoded video. The additional data may be included as part of the coded video sequence(s). The additional data may be used by the video decoder 210 to properly decode the data and/or to more accurately reconstruct the original video data. Additional data can be in the form of, for example, temporal, spatial, or SNR enhancement layers, redundant slices, redundant pictures, forward error correction codes, and so on.

Figure 4:
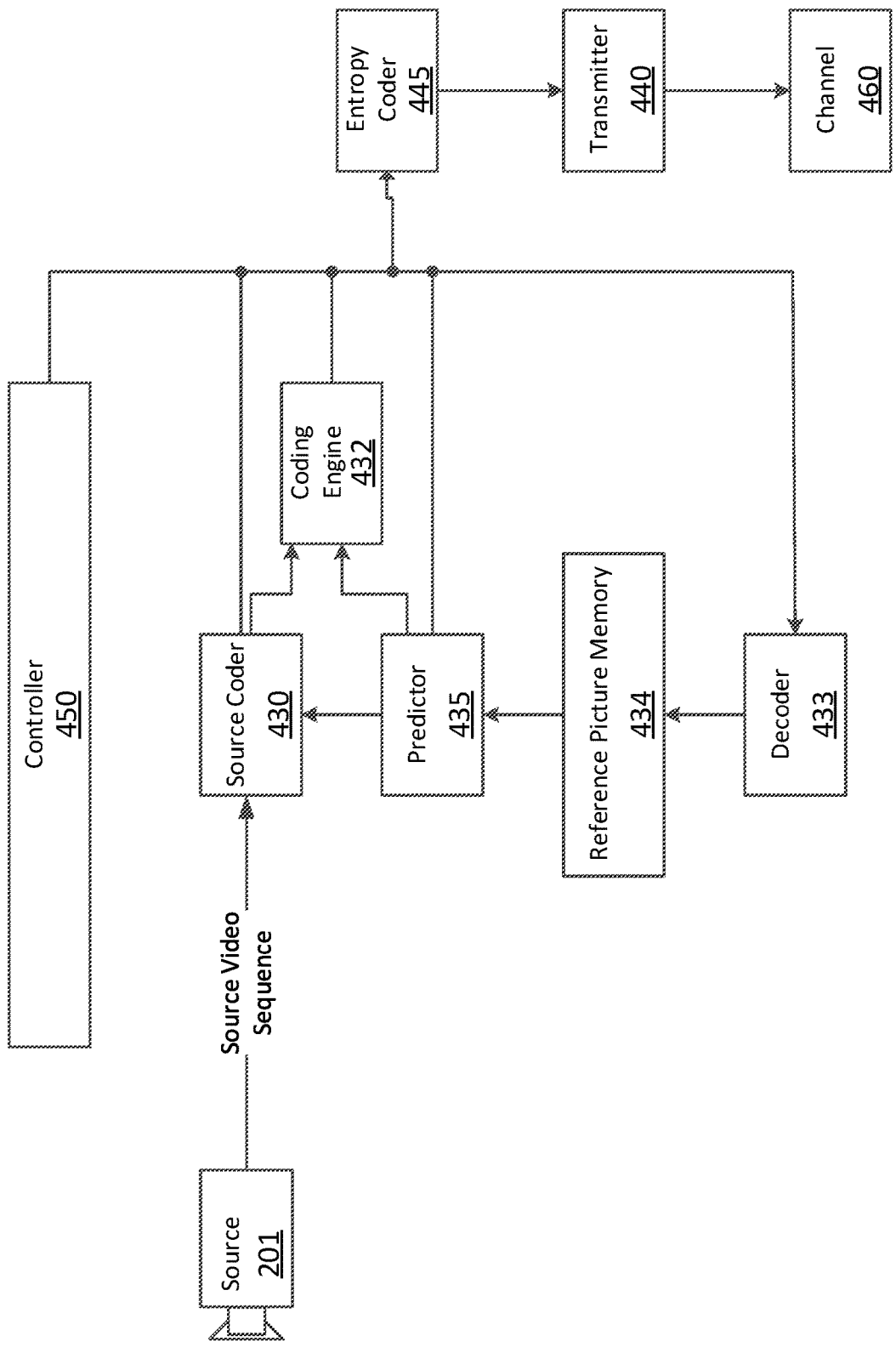
FIG. 4 is a schematic illustration of a simplified block diagram of an encoder in accordance with an embodiment.

FIG. 4 illustrates an example functional block diagram of a video encoder 203 associated with a video source 201 according to an embodiment of the present disclosure.

The video encoder 203 may include, for example, an encoder that is a source coder 430, a coding engine 432, a (local) decoder 433, a reference picture memory 434, a predictor 435, a transmitter 440, an entropy coder 445, a controller 450, and a channel 460.

The encoder 203 may receive video samples from a video source 201 (that is not part of the encoder) that may capture video image(s) to be coded by the encoder 203.

The video source 201 may provide the source video sequence to be coded by the encoder 203 in the form of a digital video sample stream that can be of any suitable bit depth (for example: x bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source 201 may be a storage device storing previously prepared video. In a videoconferencing system, the video source 203 may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder 203 may code and compress the pictures of the source video sequence into a coded video sequence 443 in real time or under any other time constraints as required by the application. Enforcing appropriate coding speed may be one function of the controller 450. The controller 450 may also control other functional units as described below and may be functionally coupled to these units. The coupling is not depicted for clarity. Parameters set by the controller 450 can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller 450 as they may pertain to video encoder (203) optimized for a certain system design.

Some video encoders operate in what a person skilled in the are readily recognizes as a "coding loop". As a simplified description, a coding loop can consist of the encoding part of the source coder 430 (responsible for creating symbols based on an input picture to be coded, and a reference picture(s)), and the (local) decoder 433 embedded in the encoder 203 that reconstructs the symbols to create the sample data that a (remote) decoder also would create, when a compression between symbols and coded video bitstream is lossless in certain video compression technologies. That reconstructed sample stream may be input to the reference picture memory 434. As the decoding of a symbol stream leads to bit-exact results independent of decoder location (local or remote), the reference picture memory content is also bit exact between a local encoder and a remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is known to a person skilled in the art.

The operation of the "local" decoder 433 can be substantially the same as of a "remote" decoder 210, which has already been described in detail above in conjunction with FIG. 3. However, as symbols are available and en/decoding of symbols to a coded video sequence by the entropy coder 445 and the parser 320 can be lossless, the entropy decoding parts of decoder 210, including channel 312, receiver 310, buffer 315, and parser 320 may not be fully implemented in the local decoder 433.

An observation that can be made at this point is that any decoder technology, except the parsing/entropy decoding that is present in a decoder, may need to be present in substantially identical functional form in a corresponding encoder. For this reason, the disclosed subject matter focuses on decoder operation. The description of encoder technologies can be abbreviated as they may be the inverse of the comprehensively described decoder technologies. Only in certain areas a more detail description is required and provided below.

As part of its operation, the source coder 430 may perform motion compensated predictive coding, which codes an input frame predictively with reference to one or more previously-coded frames from the video sequence that were designated as "reference frames." In this manner, the coding engine 432 codes differences between pixel blocks of an input frame and pixel blocks of reference frame(s) that may be selected as prediction reference(s) to the input frame.

The local video decoder 433 may decode coded video data of frames that may be designated as reference frames, based on symbols created by the source coder 430. Operations of the coding engine 432 may advantageously be lossy processes. When the coded video data is decoded at a video decoder (not shown in FIG. 4), the reconstructed video sequence typically may be a replica of the source video sequence with some errors. The local video decoder 433 replicates decoding processes that may be performed by the video decoder on reference frames and may cause reconstructed reference frames to be stored in the reference picture memory 434. In this manner, the encoder 203 may store copies of reconstructed reference frames locally that have common content as the reconstructed reference frames that will be obtained by a far-end video decoder (absent transmission errors).

The predictor 435 may perform prediction searches for the coding engine 432. That is, for a new frame to be coded, the predictor 435 may search the reference picture memory 434 for sample data (as candidate reference pixel blocks) or certain metadata such as reference picture motion vectors, block shapes, and so on, that may serve as an appropriate prediction reference for the new pictures. The predictor 435 may operate on a sample block-by-pixel block basis to find appropriate prediction references. In some cases, as determined by search results obtained by the predictor 435, an input picture may have prediction references drawn from multiple reference pictures stored in the reference picture memory 434.

The controller 450 may manage coding operations of the video coder 430, including, for example, setting of parameters and subgroup parameters used for encoding the video data.

Output of all aforementioned functional units may be subjected to entropy coding in the entropy coder 445. The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter 440 may buffer the coded video sequence(s) as created by the entropy coder 445 to prepare it for transmission via a communication channel 460, which may be a hardware/software link to a storage device which would store the encoded video data. The transmitter 440 may merge coded video data from the video coder 430 with other data to be transmitted, for example, coded audio data and/or ancillary data streams (sources not shown).

The controller 450 may manage operation of the encoder 203. During coding, the controller 450 may assign to each coded picture a certain coded picture type, which may affect the coding techniques that may be applied to the respective picture. For example, pictures often may be assigned as an Intra Picture (I picture), a Predictive Picture (P picture), or a Bi-directionally Predictive Picture (B Picture).

An Intra Picture (I picture) may be one that may be coded and decoded without using any other frame in the sequence as a source of prediction. Some video codecs allow for different types of Intra pictures, including, for example Independent Decoder Refresh (IDR) Pictures. A person skilled in the art is aware of those variants of I pictures and their respective applications and features.

A Predictive Picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded non-predictively, via spatial prediction or via temporal prediction with reference to one previously coded reference pictures. Blocks of B pictures may be coded non-predictively, via spatial prediction or via temporal prediction with reference to one or two previously coded reference pictures.

The video coder 203 may perform coding operations according to a predetermined video coding technology or standard, such as ITU-T Rec. H.265. In its operation, the video coder 203 may perform various compression operations, including predictive coding operations that exploit temporal and spatial redundancies in the input video sequence. The coded video data, therefore, may conform to a syntax specified by the video coding technology or standard being used.

In an embodiment, the transmitter 440 may transmit additional data with the encoded video. The video coder 430 may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

[End of Boiler Plate]

As described below, embodiments of the present disclosure provide methods and systems that may include modifications to the methods and systems for slice, tile, or brick used in the current VVC working draft (see, e.g. "Versatile Video Coding (Draft 5)"). For example, some embodiments of the present disclosure provide an implicit derivation rule for the values of syntax elements "top_left_brick_idx[i]" and "bottom_right_brick_idx_delta[i]" of VVC working draft, for the last rectangular slice of a coded picture. In some embodiments of the present disclosure, the syntax element "num_brick_rows_minus1[i]" of VVC working draft is replaced with the syntax element "num_brick_rows_minus2[i]."

The methods and systems of the present disclosure may be used separately or combined in any order. Further, each of the methods, systems, encoders, and decoders of the present disclosure may be implemented by processing circuitry (e.g., one or more processors or one or more integrated circuits). In one example, one or more processors execute a program that is stored in a non-transitory computer-readable medium to perform one or more of the methods of the present disclosure. In the following descriptions, the term block may be interpreted as a prediction block, a coding block, or a coding unit, i.e. CU.

According to embodiments, a picture may be divided into one or more tiles. A tile may be a sequence of CTUs that corresponds to a rectangular sub-region of a picture. A tile may be divided into one or more bricks. A slice may contain a number of tiles of a picture or a number of bricks of a tile. Two modes of slices are supported by embodiments of the present disclosure: raster-scan slice mode and rectangular slice mode. In the raster-scan slice mode, a slice contains a sequence of tiles in a tile raster scan of a picture. In the rectangular slice mode, a slice contains a number of bricks of a picture that collectively form a rectangular region.

Figure 5:
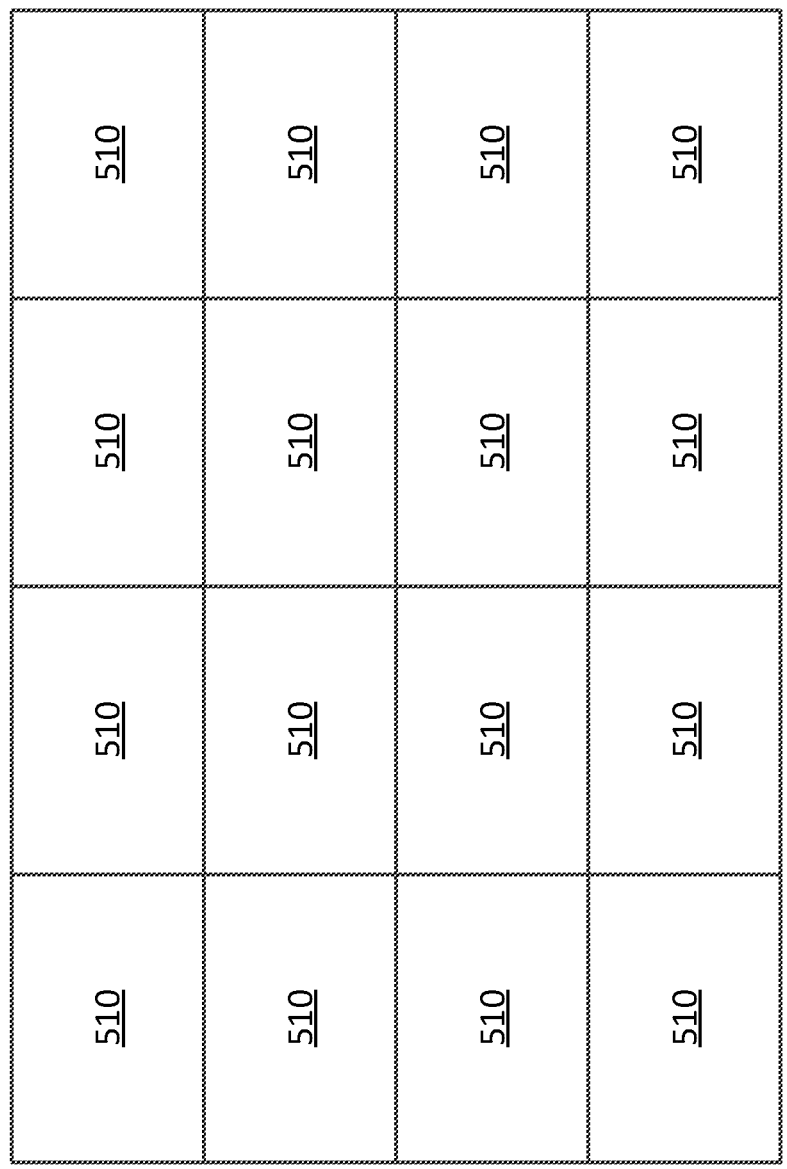
FIG. 5 is a diagram for illustrating tile partitioning of a picture in accordance with an embodiment.
Figure 7:
FIG. 7 is a diagram for illustrating slice partitioning of the picture in accordance with an embodiment.

FIGS. 5-7 illustrate an example of a picture 500 partitioned into sixteen tiles 510, twenty-one bricks 520, and seven rectangular slices 530.

With reference to FIG. 5, as an example, the picture 500 is partitioned into the tiles 510, wherein each tile has a rectangular shape. In an embodiment, as illustrated in FIG. 5, each of the tiles 510 may have a same size.

With reference to FIG. 6, the picture 500 may be further partitioned into one or more bricks 520. For illustrative purposes in FIG. 6, the partition of the tiles (510) is shown with solid lines, and the partition of the bricks 520 is shown with broken lines. According to embodiments, the bricks 520 may each have a rectangular shape and one or more of the bricks 520 may have different sizes. For example, FIG. 6 illustrates some of the bricks 520 with a size corresponding to the size of one of the tiles 510, some of the bricks 520 with a size that is ½ have the size of one of the tiles 510 in which the brick is located, and some of the bricks 520 with a size that is ¼ the size of one of the tiles 510 in which the brick is located. According to embodiments, the bricks 520 may have any size, and may be located (or not located) in any number of the tiles 510 and the slices 520.

With reference to FIG. 7, the picture 500 may be further partitioned into one or more slices 530 (e.g. rectangular slices). For illustrative purposes in FIG. 7, the partition of the tiles 510 is shown with solid lines, the partition of the slices 530 is show with bold, solid lines, and the partition of the bricks 520 is shown with broken lines. According to embodiments, the slices 530 may be of different sizes and one or more of the slices 30 may comprise a plurality of the tiles 510. For example, the top-left slice and bottom-right slice from among the slices 530 of FIG. 7 each include four of the tiles 510, and the top-right slice from among the slices 530 of FIG. 7 includes two of the tiles 510. According to embodiments, one or more of the slices 530 may have a size smaller than a single one of the tiles 510. For example, FIG. 7 illustrates four of the slices 530 that are each half the size of a single one of the tiles 510. According to embodiments, the tiles 510 may have any size and may contain any number of slices 530 or only a portion of a slice. According to embodiments, one or more of the tiles 510 may not be included in any of the slices 530. For example, FIG. 7 illustrates four of the tiles 510 at the bottom-left of the picture 500 that are not includes in any of the slices 530.

According to embodiments, each of the slices 530 may contain (a) a plurality of the tiles 510 and no bricks 520, (b) a plurality of the tiles 510 and at least one of the bricks 520, (c) less than one of the tiles 510 and no bricks 520, or (d) less than one of the tiles 510 and at least one of the bricks 520. According to embodiments, and as illustrated in FIG. 7 as an example, one or more of the tiles 510 and one or more of the bricks 520 may not be provided in any of the slices 530.

According to embodiments, the slices, tiles, and bricks of the present disclosure may correspond to the scope of slices, tiles, and bricks of VVC. For example, a tile may be a rectangular region of coding tree units (CTUs) within a particular tile column and a particular tile row in a picture. A "CTU" may refer to a coding tree block (CTB) of luma samples, two corresponding CTBs of chroma samples of a picture that has three sample arrays, or a CTB of samples of a monochrome picture or a picture that is coded using three separate colour planes and syntax structures used to code the samples. The term "tile column" may refer to a a rectangular region of CTUs having a height equal to the height of the picture and a width specified by syntax elements in, for example, a picture parameter set. The term "tile row" may refer to a rectangular region of CTUs having a height specified by syntax elements in, for example, a picture parameter set and a width equal to the width of the picture. A brick may be a rectangular region of CTU rows within a particular tile in a picture. A slice may be an integer number of bricks of a picture that are exclusively contained in a single network abstract layer (NAL) unit. The slice may comprise or consist of a number of complete tiles or only a consecutive sequence of complete bricks of one tile.

According to embodiments, aspects (e.g. size and/or position) of the tile, brick, and slice partitions of pictures may be signaled for encoding or decoding of the pictures.

In one or more embodiments of the present disclosure, a bit-efficient signaling of the syntax elements "top_left_brick_idx[i]" and "bottom_right_brick_idx_delta[i]" is provided. In particular, the one or more embodiments provide an implicit derivation rule of the values of the syntax elements "top_left_brick_idx[i]" and "bottom_right_brick_idx_delta[i]", for the last rectangular slice of, for example, a coded picture. The implicit derivation rule is described below with reference to TABLES 1-3, provided below.

TABLE 1, provided below, shows an excerpt of example code of a picture parameter set (PPS) of an embodiment that may be included in a bitstream for decoding at least one picture.

TABLE 1

| pic_parameter_set_rbsp( ) { | Descriptor |
|---|---|
|   if( rect_slice_flag && !single_brick_per_slice_flag) { | |
|     num_slices_in_pic_minus1 | ue(v) |
|     for( i = 0; i <= num_slices_in_pic_minus1; i++) { | |
|       if( i > 0 && i != num_slices_in_pic_minus1 ) | |
|         top_left_brick_idx[ i ] | u(v) |
|       if( i != num_slices_in_pic_minus1 ) | |
|         bottom_right_brick_idx_delta[ i ] | u(v) |
|     } | |
|   } | |
|   loop_filter_across_bricks_enabled_flag | u(1) |
|   if( loop_filter_across_bricks_enabled_flag ) | |

The syntax element "rect_slice_flag" when equal to 0 may specify that bricks within each slice are in raster scan order and the slice information is not signalled in PPS. When equal to 1, the syntax element may specify that bricks within each slice cover a rectangular region of the picture and the slice information is signalled in the PPS.

The syntax element "single_brick_per_slice_flag" when equal to 1 may specify that each slice that refers to this PPS includes one brick and, when equal to 0, may specify that a slice that refers to this PPS may include more than one brick. When a value of the syntax element is not present, the value of the syntax element may be inferred to be equal to 1.

The syntax element "num_slices_in_pic_minus1" plus 1 may specify the number of slices in each picture referring to the PPS. The value of the syntax element may be in a range of 0 to "NumBricksInPic"−1, inclusive. That is, the number of slices in a picture may be equal to or less than the number of bricks in the picture. When the value of "num_slices_in_pic_minus1" is not present and "single_brick_per_slice_flag" is equal to 1, the value of "num_slices_inpic_minus1" may be inferred to be equal to "NumBricksInPic"−1.

The syntax element "top_left_brick_idx[i]" may specify the brick index of the brick located at the top-left corner of the i-th slice. The value of "top_left_brick_idx[i]" may not be equal to the value of "top_left_brick_idx[j]" for any i not equal to j. When not present, the value of "top_left_brick_idx[i]" may be inferred to be equal to i. The length of the "top_left_brick_idx[i]" syntax element may be Ceil(Log 2(NumBricksInPic) bits.

The syntax element "bottom_right_brick_idx_delta[i]" may specify the difference between the brick index of the brick located at the bottom-right corner of the i-th slice and "top_left_brick_idx[i]". When the syntax element "single_brick_per_slice_flag" is equal to 1, the value of "bottom_right_brick_idx_delta[i]" may be inferred to be equal to 0. The length of the "bottom_right_brick_idx_delta[i]" syntax element may be Ceil(Log 2(NumBricksInPic−top_left_brick_idx[i])) bits.

According to the example code of TABLE 1, (a) in a first slice, the index of top-left-brick may be inferred to be equal to 0 and "bottom_right_brick_idx_delta[i]" may be explicitly signaled; (b) in slices other than the first slice and a last slice, the index of the top-left brick and "bottom_right_brick_idx_delta[i]" may be explicitly signaled; and (c) in the last slice, the index of the top-left brick and "bottom_right_brick_idx_delta[i]" may not be explicitly signaled. That is, with respect to the last slice, the index of the top-left brick and "bottom_right_brick_idx_delta[i]" may be inferred.

According to an embodiment, it may be a requirement of bitstream conformance that a slice shall include either a number of complete tiles or only a consecutive sequence of complete bricks of one tile.

TABLES 2-3, provided below, show excerpts of example code that may be executed by an encoder or decoder for encoding or decoding at least one picture. The example codes of TABLES 1-3 may be executed in the order of TABLE 1, TABLE 2, and TABLE 3. The example code of TABLES 2-3 demonstrates an example of how the variable "NumBricksInSlice[i]" and "BricksToSliceMap[j]", which specify the number of bricks in the i-th slice and the mapping of bricks to slices, respectively, may be derived.

TABLE 2

```
if( i == 0)
    for( j = 0; j < NumBricksInPic; j++ )
        BricksToSliceMap[ j ] = num_slices_in_pic_minus1
if( i == num_slices_in_pic_minus1 ) {
    j = 0;
    while( BricksToSliceMap[ j ] == num_slices_in_pic_minus1 )
        j++
    topLeftBkIdx = j
    botRightBkIdx = NumBricksInPic − 1
}
else {
    topLeftBkIdx = top_left_brick_idx[ i ]
    botRightBkIdx = top_left_brick_idx[ i ] +
        bottom_right_brick_idx_delta[ i ]
}
```

The variable "NumBricksInPic" may specify the numbers of bricks in a picture referring to the PPS. The syntax element "topLeftBkIdx" may specify the brick index of the brick located at the top-left corner of a particular slice. The syntax element "botRightBkIdx" may specify the brick index of the brick located at the bottom-right corner of a particular slice.

With reference to TABLE 2, the syntax elements "topLeftBkIdx" and "botRightBkIdx" may be set to values based on a current value of the variable "i".

For example, when the code of TABLE 2 is executed for any slice other than a last slice of a picture (e.g. "i" is not equal to variable "num_slices_inpic_minus1"), the syntax element "topLeftBkIdx" may be set to the value of "top_left_brick_idx[i]" and the syntax element "botRightBkIdx" may be set to the sum of the values of "top_left_brick_idx[i]" and "bottom_right_brick_idx_delta[i]", wherein "i" corresponds to the i-th slice that is not the last slice of the picture.

In a case where the code of TABLE 2 is executed for for the last slice of a picture (e.g. "i" is equal to variable "num_slices_inpic_minus1"), the syntax element "topLeftBkIdx" may be set to a value corresponding to the sum of 1 plus the index value of the last brick of the second to last slice (e.g. highest indexed brick of the second highest indexed slice). Additionaly, the syntax element "botRightBkIdx" may be set to the value of "NumBricksInPic"−1 (e.g. a value corresponding to the highest indexed brick of the picture). According to the above, an encoder or a decoder may obtain the index value of a top-left brick and a bottom-right brick of a last slice of a picture based on the last brick of a previous slice of the picture and based on the number of slices of the picture, respectively. In other words, such index values of the two bricks of the last slice may obtained without explicitly signaling "top_left_tile_idx[i]" and "bottom_right_brick_idx_delta[i]" for the last slice of the picture.

Following execution of the code of TABLE 2, the code of TABLE 3, provided below, may be executed.

TABLE 3

```
NumBricksInSlice[ i ] = 0
for( j = 0; j < NumBricksInPic; j++) {
    if( BrickColBd[ j ] >= BrickColBd[ topLeftBkIdx ] &&
        BrickColBd[ j ] <= BrickColBd[ botRightBkIdx ] &&
        BrickRowBd[ j ] >= BrickRowBd[ topLeftBkIdx ] &&
        BrickRowBd[ j ] <= BrickRowBd [ botRightBkIdx ] ) {
        NumBricksInSlice[ i ]++
        BricksToSliceMap[ j ] = i
    }
}
```

The lists BrickColBd[j], BrickRowBd[j], BrickWidth[j], and BrickHeight[j] may specify the locations of the vertical brick boundaries in units of coding tree blocks (CTBs), the locations of the horizontal brick boundaries in units of CTBs, the widths of the bricks in units of CTBs, and the heights of bricks in units of CTBs, respectively. The term "CTB" may refer to an N×N block of samples for some value of N such that the division of a component into CTBs is a partitioning.

With reference to the example code of TABLE 3, the number of bricks of each slice of a picture and the mapping of bricks to slices may be derived based on values (e.g. "topLeftBkIdx" and "botRightBkIdx") obtained from executing the code of TABLE 2.

Figure 8:
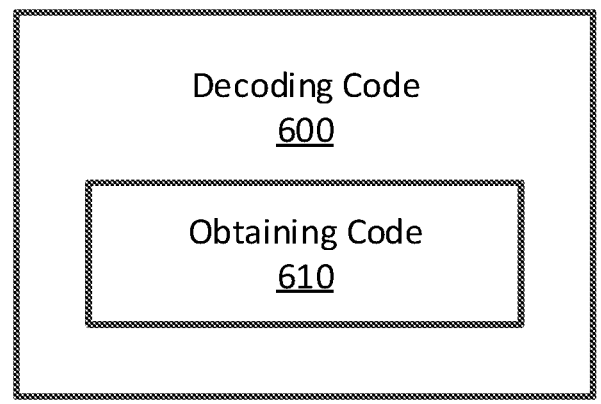
FIG. 8 is a diagram illustrating computer program code in accordance with an embodiment.

According to embodiments, a system may comprise memory configured to store computer program code and at least one processor configured to receive a coded video stream, the coded video stream including a picture partitioned into the slices. The at least one processor may be further configured to access the computer program code, and operate as instructed by the computer program code. With reference to FIG. 8, the computer program code may comprise decoding code 600 configured to cause the at least one processor to decode the picture using tile, brick, and slice partitioning. The decoding code 600 may comprise obtaining code 610 configured to cause the at least one processor to obtain index values of bricks of the slices as described above. The obtaining code 610 may also be configured to cause the at least one processor to obtain the number of bricks of each slice of a picture and the mapping of bricks to slices.

According to the above embodiment, bit efficiency may be increased by obtaining the index positions of bricks within a last slice, without explicit signaling of such index positions.

According to one or more embodiments, methods and systems of the present disclosure may alternatively or additionally include other modifications to the methods and systems for slice, tile, or brick used in the current VVC working draft. For example, to increase bit-efficiency, the syntax element "num_brick_rows_minus1 [i]" of VVC working draft may be replaced with the syntax element "num_brick_rows_minus2[i]." TABLE 4, below, shows an excerpt of code of a PPS in accordance with an embodiment of the present disclosure, which may be executed by an encoder or a decoder of the present disclosure to encode or decode one or more pictures.

TABLE 4

| pic_parameter_set_rbsp( ) { | Descriptor |
|---|---|
| ... | |
|   brick_split_flag[ i ] | u(1) |
|   if( brick_split_flag[ i ] ) { | |
|     uniform_brick_spacing_flag[ i ] | u(1) |
|     if( uniform_brick_spacing_flag[ i ] ) | |
|       brick_height_minus1[ i ] | ue(v) |
|     else { | |
|       num_brick_rows_minus2[ i ] | ue(v) |
|       for( j = 0; j < num_brick_rows_minus2 [ i ]; j++ ) | |
|         brick_row_height_minus1[ i ][ j ] | ue(v) |
|     } | |
|   } | |
| } | |
| ... | |
| } | |

The syntax element "brick split flag[i]" when equal to 1 may specify that the i-th tile is divided into two or more bricks and, when equal to 0, may specify that the i-th tile is not divided into two or more bricks. When not present, the value of "brick split flag[i]" may be inferred to be equal to 0.

The syntax element "uniform brick spacing flag[i]" when equal to 1 may specify that horizontal brick boundaries are distributed uniformly across the i-th tile and signaled using a syntax element (e.g. "brick height minus1[i]") and, when equal to 0, may specify that horizontal brick boundaries may or may not be distributed uniformly across i-th tile and signaled using syntax elements (e.g. "num_brick_rows_minus2[i]" and "brick row height minus1 [i][j]"). When not present, the value of "uniform brick spacing flag[i]" may be inferred to be equal to 1.

The syntax element "brick height minus1[i]" plus 1 may specify the height of the brick rows excluding the bottom brick in the i-th tile in units of CTBs when "uniform brick spacing flag[i]" is equal to 1. When present, the value of "num_brick_rows_minus1[i]" may be in the range of 1 to RowHeight[i]−1, inclusive. When not present, the value of "brick height minus1 [i]" may be inferred to be equal to "RowHeight[i]"−1. The syntax element "RowHeight[i]" may specify the height of an i-th tile row in units of CTBs.

The syntax element "num_brick_rows_minus2[i]" plus 1 may specify the number of bricks partitioning the i-th tile when "uniform brick spacing flag[i]" is equal to 0. When present, the value of "num_brick_rows_minus2[i]" may be in the range of 1 to "RowHeight[i]"−1, inclusive. If "brick split flag[i]" is equal to 0, the value of "num_brick_ rows_minus1 [i]" may be inferred to be equal to 0. Otherwise, when "uniform brick spacing flag[i]" is equal to 1, the value of "num_brick_rows_minus2[i]" may be inferred based on CTB raster scanning, tile scanning, and brick scanning processes of VVC.

Embodiments of the present disclosure that implement code, such as the code excerpt of TABLE 4 that includes syntax element "num_brick_rows_minus2", may increase bit-efficiency because the value of a syntax element "num_brick_rows_minus1" shall be greater than 1 if "brick_split_flag[i]" is equal to 1.

[Start of Boiler Plate]

In embodiments of the present disclosure, at least one processor may encode pictures in accordance with tile group and tile partitioning design of the present disclosure and send a coded video bitstream, that includes one or more encoded tile groups and tiles, to one or more decoders and MANEs for decoding in accordance with the tile grop and tile partitioning design of the present disclosure.

The techniques for encoding and decoding, including tile and tile group identification, described above, can be implemented as computer software using computer-readable instructions and physically stored in one or more computer-readable media. For example, FIG. 9 shows a computer system 900 suitable for implementing embodiments of the disclosed subject matter.

The techniques, described above, can be implemented as computer software using computer-readable instructions and physically stored in one or more computer-readable media. For example, FIG. 9 shows a computer system 900 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 9 for computer system 900 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 900.

Computer system 900 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 901, mouse 902, trackpad 903, touch screen 910, data-glove, joystick 905, microphone 906, scanner 907, camera 908.

Computer system 900 may also include certain human interface output devices.

Such human interface output devices may be stimulating the senses of one or more human users through, for example, tactile output, sound, light, and smell/taste. Such human interface output devices may include tactile output devices (for example tactile feedback by the touch-screen 910, data glove, or joystick 905, but there can also be tactile feedback devices that do not serve as input devices). For example, such devices may be audio output devices (such as: speakers 909, headphones (not depicted)), visual output devices (such as screens 910 to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system 900 can also include human accessible storage devices and their associated media such as optical media including CD/DVD ROM/RW 920 with CD/DVD or the like media 921, thumb-drive 922, removable hard drive or solid state drive 923, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 900 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 949 (such as, for example USB ports of the computer system 900; others are commonly integrated into the core of the computer system 900 by attachment to a system bus as described below (for example Ethernet interface into a PC computer system or cellular network interface into a smartphone computer system). Using any of these networks, computer system 900 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 955. Certain protocols and protocol stacks can be used on each of those networks and network interfaces as described above.

Aforementioned human interface devices, human-accessible storage devices, and network interfaces 954 can be attached to a core 940 of the computer system 900.

The core 940 can include one or more Central Processing Units (CPU) 941, Graphics Processing Units (GPU) 942, specialized programmable processing units in the form of Field Programmable Gate Areas (FPGA) 943, hardware accelerators for certain tasks 944, and so forth. These devices, along with Read-only memory (ROM) 945, Random-access memory 946, internal mass storage such as internal non-user accessible hard drives, SSDs, and the like 947, may be connected through a system bus 948. In some computer systems, the system bus 948 can be accessible in the form of one or more physical plugs to enable extensions by additional CPUs, GPU, and the like. The peripheral devices can be attached either directly to the core's system bus 948, or through a peripheral bus 949. Architectures for a peripheral bus include PCI, USB, and the like. A graphics adapter 950 may be included in the core 940.

CPUs 941, GPUs 942, FPGAs 943, and accelerators 944 can execute certain instructions that, in combination, can make up the aforementioned computer code. That computer code can be stored in ROM 945 or RAM 946. Transitional data can be also be stored in RAM 946, whereas permanent data can be stored for example, in the internal mass storage 947. Fast storage and retrieve to any of the memory devices can be enabled through the use of cache memory, that can be closely associated with one or more CPU 941, GPU 942, mass storage 947, ROM 945, RAM 946, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 900, and specifically the core 940 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 940 that are of non-transitory nature, such as core-internal mass storage 947 or ROM 945. The software implementing various embodiments of the present disclosure can be stored in such devices and executed by core 940. A computer-readable medium can include one or more memory devices or chips, according to particular needs. The software can cause the core 940 and specifically the processors therein (including CPU, GPU, FPGA, and the like) to execute particular processes or particular parts of particular processes described herein, including defining data structures stored in RAM 946 and modifying such data structures according to the processes defined by the software. In addition or as an alternative, the computer system can provide functionality as a result of logic hardwired or otherwise embodied in a circuit (for example: accelerator 944), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method performed by at least one processor, the method comprising:
   receiving a coded video stream including a picture partitioned into first sub-picture units, the first sub-picture units including:
   one first sub-picture unit, and
   an additional first sub-picture unit including a first ordered second sub-picture unit, from among second sub-picture units of the additional first sub-picture unit, and a last ordered second sub-picture unit, from among the second sub-picture units of the additional first sub-picture unit; and
   decoding the picture, the decoding comprising:
   obtaining index values of the first ordered second sub-picture unit and the last ordered second sub-picture unit of the additional first sub-picture unit, without the coded video stream explicitly signaling any of the index values and a difference value between the index values of the first ordered second sub-picture unit and the last ordered second sub-picture unit to the at least one processor,
   wherein the additional first sub-picture unit has an order value that is subsequent to an order value of the one first sub-picture unit, and
   wherein the first sub-picture units are rectangular slices and the second sub-picture units are bricks.

2. The method of claim 1, wherein
   the one first sub-picture unit includes a last ordered second sub-picture unit, from among second sub-picture units of the one first sub-picture unit, and
   the obtaining the index value of the first ordered second sub-picture unit of the additional first sub-picture unit comprises obtaining the index value of the first ordered second sub-picture unit of the additional first sub-picture unit based on an index value of the last ordered second sub-picture unit of the one first sub-picture unit.

3. The method of claim 1, wherein
   the obtaining the index value of the last ordered second sub-picture unit of the additional first sub-picture unit comprises obtaining the index value of the last ordered second sub-picture unit of the additional first sub-picture unit based on a value corresponding to a total number of second sub-picture units within all of the first sub-picture units within the picture.

4. The method of claim 1, wherein
   the one first sub-picture unit includes a last ordered second sub-picture unit, from among second sub-picture units of the one first sub-picture unit, and
   the obtaining the index value of the first ordered second sub-picture unit of the additional first sub-picture unit comprises obtaining the index value of the first ordered second sub-picture unit of the additional first sub-picture unit based on the index value of the last ordered second sub-picture unit of the one first sub-picture unit, and
   the obtaining the index value of the last ordered second sub-picture unit of the additional first sub-picture unit comprises obtaining the index value of the last ordered second sub-picture unit of the additional first sub-picture unit based on a value corresponding to a total number of second sub-picture units from all of the first sub-picture units within the picture.

5. The method of claim 4, wherein the additional first sub-picture unit is a last ordered slice of the picture, and the one first sub-picture unit is a second to last ordered slice of the picture.

6. The method of claim 5, wherein
the last ordered second sub-picture unit of the one first sub-picture unit is a bottom-right brick of the one first sub-picture unit, and
the first ordered second sub-picture unit of the additional first sub-picture unit is a top-left brick of the additional first sub-picture unit, and the last ordered second sub-picture unit of the additional first sub-picture unit is a bottom-right brick of the additional first sub-picture unit.

7. The method of claim 1, wherein the additional first sub-picture unit is a last ordered slice of the picture, and the one first sub-picture unit is a second to last ordered slice of the picture.

8. The method of claim 1, wherein the decoding further comprises:
obtaining an index value of a first ordered second sub-picture unit of the one first sub-picture unit and an index value of the last ordered second sub-picture unit of the one first sub-picture unit,
wherein the index value of the first ordered second sub-picture unit of the one first sub-picture unit, and the index value of the last ordered second sub-picture unit of the one first sub-picture unit are obtained based on a picture parameter set.

9. A system for decoding a coded video stream, the system comprising:
memory configured to store computer program code; and
at least one processor configured to receive the coded video stream, the coded video stream including a picture partitioned into first sub-picture units including:
one first sub-picture unit, and
an additional first sub-picture unit including a first ordered second sub-picture unit, from among second sub-picture units of the additional first sub-picture unit, and a last ordered second sub-picture unit, from among the second sub-picture units of the additional first sub-picture unit,
wherein the at least one processor is further configured to access the computer program code, and operate as instructed by the computer program code, the computer program code comprising decoding code configured to cause the at least one processor to:
obtain index values of the first ordered second sub-picture unit and the last ordered second sub-picture unit of the additional first sub-picture unit, without the coded video stream explicitly signaling the index values and a difference value between the index values of the first ordered second sub-picture unit and the last ordered second sub-picture unit to the at least one processor,
wherein the additional first sub-picture unit has an order value that is subsequent to an order value of the one first sub-picture unit, and
wherein the first sub-picture units are rectangular slices and the second sub-picture units are bricks.

10. The system of claim 9, wherein
the one first sub-picture unit includes a last ordered second sub-picture unit, from among second sub-picture units of the one first sub-picture unit, and
the decoding code is configured to cause the at least one processor to obtain the index value of the first ordered second sub-picture unit of the additional first sub-picture unit based on an index value of the last ordered second sub-picture unit of the one first sub-picture unit.

11. The system of claim 9, wherein
the decoding code is configured to cause the at least one processor to obtain the index value of the last ordered second sub-picture unit of the additional first sub-picture unit based on a value corresponding to a total number of second sub-picture units within all of the first sub-picture units within the picture.

12. The system of claim 9, wherein
the one first sub-picture unit includes a last ordered second sub-picture unit, from among second sub-picture units of the one first sub-picture unit, and
the decoding code is configured to cause the at least one processor to:
obtain the index value of the first ordered second sub-picture unit of the additional first sub-picture unit based on the index value of the last ordered second sub-picture unit of the one first sub-picture unit, and
obtain the index value of the last ordered second sub-picture unit of the additional first sub-picture unit based on a value corresponding to a total number of second sub-picture units from all of the first sub-picture units within the picture.

13. The system of claim 12, wherein the additional first sub-picture unit is a last ordered slice of the picture, and the one first sub-picture unit is a second to last ordered slice of the picture.

14. The system of claim 13, wherein
the last ordered second sub-picture unit of the one first sub-picture unit is a bottom-right brick of the one first sub-picture unit, and
the first ordered second sub-picture unit of the additional first sub-picture unit is a top-left brick of the additional first sub-picture unit, and the last ordered second sub-picture unit of the additional first sub-picture unit is a bottom-right brick of the additional first sub-picture unit.

15. The system of claim 9, wherein the additional first sub-picture unit is a last ordered slice of the picture, and the one first sub-picture unit is a second to last ordered slice of the picture.

16. A non-transitory computer-readable medium storing computer instructions that, when executed by at least one processor, cause the at least one processor to:
decode a picture from a coded video stream that includes the picture partitioned into first sub-picture units that include:
one first sub-picture unit, and
an additional first sub-picture unit including a first ordered second sub-picture unit, from among second sub-picture units of the additional first sub-picture unit, and a last ordered second sub-picture unit, from among the second sub-picture units of the additional first sub-picture unit,
wherein the computer instructions are configured to cause the at least one processor to decode the picture by obtaining index values of the first ordered second sub-picture unit and the last ordered second sub-picture unit of the additional first sub-picture unit, without the coded video stream explicitly signaling the index values and a difference value between the index values of the first ordered second sub-picture unit and the last ordered second sub-picture unit to the at least one processor, wherein the additional first sub-picture unit has an order value that is subsequent to an order value of the one first sub-picture unit, and wherein the first sub-picture units are rectangular slices and the second sub-picture units are bricks.

17. The non-transitory computer-readable medium of claim 16, wherein the additional first sub-picture unit is a last ordered slice of the picture, and the one first sub-picture unit is a second to last ordered slice of the picture.

18. The non-transitory computer-readable medium of claim 16, wherein the one first sub-picture unit includes a last ordered second sub-picture unit, from among second sub-picture units of the one first sub-picture unit, and the computer instructions are configured to cause the at least one processor to:

obtain the index value of the first ordered second sub-picture unit of the additional first sub-picture unit based on the index value of the last ordered second sub-picture unit of the one first sub-picture unit, and obtain the index value of the last ordered second sub-picture unit of the additional first sub-picture unit based on a value corresponding to a total number of second sub-picture units from all of the first sub-picture units within the picture.

19. The non-transitory computer-readable medium of claim 18, wherein the last ordered second sub-picture unit of the one first sub-picture unit is a bottom-right brick of the one first sub-picture unit, and the first ordered second sub-picture unit of the additional first sub-picture unit is a top-left brick of the additional first sub-picture unit, and the last ordered second sub-picture unit of the additional first sub-picture unit is a bottom-right brick of the additional first sub-picture unit.

* * * * *